United States Patent Office 3,642,669
Patented Feb. 15, 1972

3,642,669
STABILIZED POLYURETHANES
Roland Nast, Cologne-Buchheim, and Harald Oertel and Kurt Ley, Odenthal-Globusch, Germany, assignors to Farbenfabriken Bayer Aktiengesellschaft, Leverkusen, Germany
No Drawing. Filed Sept. 4, 1969, Ser. No. 855,372
Claims priority, application Germany, Sept. 14, 1968, P 17 94 108.1, P 17 94 144.5
Int. Cl. C08g 41/00, 51/58, 51/60
U.S. Cl. 260—2.5 BB    13 Claims

ABSTRACT OF THE DISCLOSURE

The invention relates to stabilized polyurethanes, especially polyurethane elastomer threads and foils, against degradation and discoloration caused by the action of light or UV radiation, oxygen, substances present in the atmosphere, such as nitrogen oxides, and heat by the addition of alkoxy substituted, sterically hindered phenols which have a 2-(2'-hydroxy-3'-tertiary alkyl benzyl)-anisole unit:

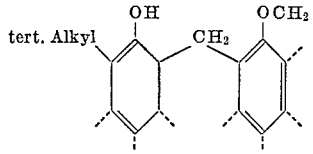

as stabilizers and furthermore to stabilized polyurethanes being stabilized with a synergistic mixture consisting of a) an anisole and b) a 2-(2'-hydroxyphenyl)-benzotriazole.

DISCLOSURE

Polyurethanes prepared from high molecular weight polyhydroxyl compounds, polyisocyanates and chain lengthening agents which are widely used in the form of foams, elastomers, coatings, foils or elastomer threads are unstable when exposed to the action of light and in some cases are also unstable to hot air. The instability depends to some extent on their structural make-up. This lends to mechanical deterioration and in many cases strong discoloration of the polyurethanes also occurs.

Many attempts have already been made to provide some protection against discoloration and degradation by the addition of antioxidants which are known per se, e.g. those based on phenols, but this stabilization is generally not sufficient.

Thus, for example phenols such as 4,4'-alkylidene-bis-(6-tertiary butyl-m-cresol), 2,6-ditertiary butyl-4-methylphenol or 4,4'-methylene-bis-(2,6-ditertiary butylphenol have been tested as stabilizers but they either initially discolor the polyurethane which is troublesome or they fail to provide protection against discoloration under the action of light or substances present in the atmosphere. The use of polyphenols such as 1,3,5-trimethyl-2,4,6-tris-(3,5-ditertiary butyl-4-hydroxy-benzyl)benzene has also been proposed as stabilizers (German Auslegeschrift 1,243,866). Furthermore, numerous phenolic compounds have been mentioned which are said to be suitable for stabilizing polyurethanes which used together with hydroxybenzophenones (DAS 1,106,490). The effect of these phenolic stabilizers, however, is not sufficient or is not wash resistant or the stabilizers themselves have a colour which makes them unsuitable e.g. for use with white elastomer threads.

A new class of phenolic stabilizers has been found which owing to their typical structure provide a highly effective stabilization of polyurethanes. Moreover, these stabilizers are colourless, cause no discolouration of the polyurethane and provide substantially better, wash-resistant protection to discoloration and degradation under the action of light and/or substances present in the atmosphere.

The invention relates to the use of 0.05 to 10% by weight of alkoxy substituted, sterically hindered, phenols of Formula I

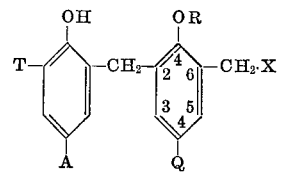

in which

T represents a tertiary alkyl group, e.g. a tertiary butyl, tertiary amyl, tertiary octyl or tertiary dodecyl radical, preferably the tertiary butyl radical, A represents a primary or secondary alkyl radical having 1 to 12 carbon atoms, preferably a methyl group or an isononyl group or the radical T, R represents a primary alkyl radical having 1 to 12 carbon atoms, preferably a methyl group, or an aralkyl radical, preferably a benzyl group, Q represents the group A or T, preferably a methyl, isononyl, tertiary butyl or tertiary octyl radical or an OR group, preferably a methoxy group or benzyloxy group, and X represents a hydrogen atom or a radical

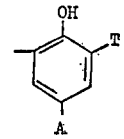

wherein the group $CH_2.X$ stands in the 6-position when Q is an alkyl group and in the 5-position when Q is an OR group as stabilizers for polyurethane elastomers.

It is preferred to use stabilizers of Formula II

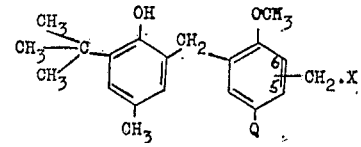

wherein

Q represents a primary alkyl radical, preferably a methyl radical, a tertiary alkyl radical, preferably a tertiary butyl or tertiary octyl radical, or a methoxy group and X represents a radical of the following formula

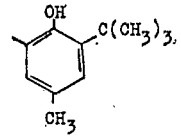

the position of $CH_2.X$ being related to the substituent Q as already defined above.

The above stabilizers are preferably used in amounts of 0.2 to 3% by weight based on the polyurethane elastomers.

The phenolic compounds used are new compounds and can be prepared by reacting 2-tertiary-alkyl-4-alkylphenols with o-hydroxymethyl-alkoxybenzenes in the presence of catalytic quantities of strong acids, water being split off in the process, for example according to the following reaction equation:

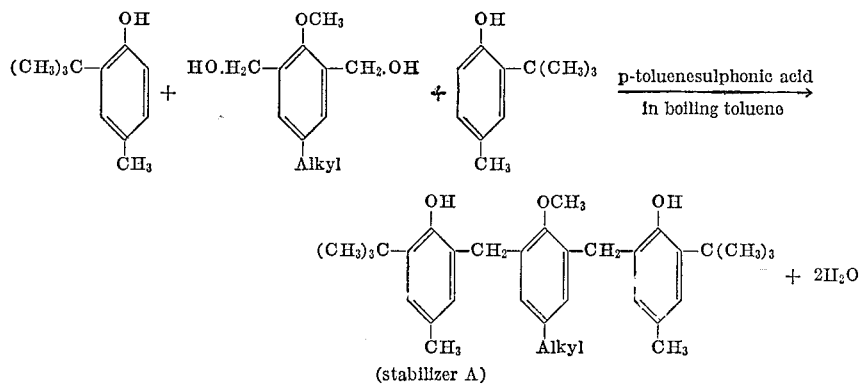

(stabilizer A)

The substantial improvement which can be achieved by using the alkoxy-substituted, sterically hindered phenols is demonstrated in comparison tests using, for comparison, corresponding compounds which contain a free hydroxyl group instead of the alkoxy substituent. In the comparison tests, a phenol, namely 1,3,5-trimethyl-2,4,6-tris-(3,5-ditertiary butyl-4-hydroxybenzyl)-benzene which may be regarded as one of the most effective phenolic compounds of those previously known (DAS 1,243,866) is also included.

It is then found, inter alia, that equivalent phenols, e.g. the following trisphenol:

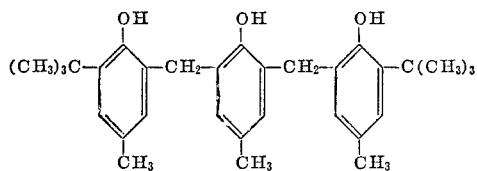

show a strong discoloration of their own (yellow), compared with the stabilizer (A) according to the invention which contains an alkoxy group instead of the middle hydroxyl group, and they are therefore unsuitable for stabilising colourless polyurethanes. Also the alkoxy substituted phenols according to the invention show better stabilization to degradation than, for example, the pure phenolic stabilizer 1,3,5-trimethyl-2,4,6-tris-(4-hydroxy-3,5-ditertiary butyl-benzyl)-benzene (according to DAS 1,243,866).

The following compounds are examples of suitable alkoxysubstituted, sterically hindered phenols which may be used according to the invention for stabilizing the polyurethanes:

2,4-dimethyl-6-(2'-hydroxy-3'-tertiary butyl-5'-methylbenzyl)-O-benzyl-phenol
2,4-dimethyl-6-(2'-hydroxy-3'-tertiarybutyl-5'-methylbenzyl)-anisole
2-methyl-4-tertiary butyl-6-(2'-hydroxy-3'-tertiary butyl-5'-methylbenzyl)-anisole
2-methyl-4-tertiary amyl-6-(2'-hydroxy-3'-tertiary butyl-5'-methylbenzyl)-anisole
2-methyl-4-tertiary octyl-6-(2'-hydroxy-3'-tertiary butyl-5'-methylbenzyl)-anisole
2-methyl-4-isononyl-6-(2'-hydroxy-3'-tertiary butyl-5'-methylbenzyl)-anisole
2-methyl-4-tertiary dodecyl-6-(2'-hydroxy-3'-tertiary butyl-5'-methylbenzyl)-anisole
2-methyl-4-isododecyl-6-(2'-hydroxy-3'-tertiary butyl-5'-methylbenzyl)-anisole
2-methyl-4-tertiary butyl-6-(2'-hydroxy-3'-tertiary butyl-5'-methylbenzyl)-O-benzyl-phenol
4-methyl-2,6-bis-(2'-hydroxy-3'-tertiary butyl-5'-methylbenzyl)-anisole
4-methyl-2,6-bis-(2'-hydroxy-3'-tertiary amyl-5'-methylbenzyl)-anisole
4-methyl-2,6-bis-(2'-hydroxy-3'-tertiary octyl-5'-methylbenzyl)-anisole
4-methyl-2,6-bis-(2'-hydroxy-3'-tertiary dodecyl-5'-methylbenzyl)-anisole
4-methyl-2,6-bis-(2'-hydroxy-3'-tertiary butyl-5'-methylbenzyl)-butoxyphenol
4-tertiary butyl-2,6-bis-(2'-hydroxy-3'-tertiary butyl-5'-methyl-benzyl)-anisol
4-tertiary butyl-2,6-bis-(2'-hydroxy-3'-tertiary amyl-5'-methyl-benzyl)-anisole
4-tertiary amyl-2,6-bis-(2'-hydroxy-3'-tertiary butyl)-5'-methyl-benzyl)-anisole
4-tertiary octyl-2,6-bis-(2'-hydroxy-3'-tertiary butyl-5'-methyl-benzyl)-anisole
4-tertiary dodecyl-2,6-bis-(2'-hydroxy-3'-tertiary butyl-5'-methyl-benzyl)-anisole
4-isononyl-2,6-bis-(2'-hydroxy-3'-tertiary butyl-5'-methylbenzyl)-anisole
4-isopropyl-2,6-bis-(2'-hydroxy-3'-tertiary butyl-5'-methylbenzyl)-anisole
4-methyl-2,6-bis.(2'-hydroxy-3'-tertiary butyl-5'-methylbenzyl)-O-benzyl phenol
2,5-bis-(2'-hypdroxy-3'-tertiary butyl-5'-methyl-benzyl)-hydroquinone-dimethylether
2,5-bis-(2'-hydroxy-3'-tertiary octyl-5'-methyl-benzyl) hydroquinone-dimethyl ether
2,5-bis-(2'-hydroxy-3'-tertiary dodecyl-5'-methyl-benzyl-hydroquinone-dimethyl ether
2,5-bis-(2'-hydroxy-3'-tertiary butyl-5'-isopropyl-benzyl)-hydroquinone-dimethyl ether
2,5-bis-(2'-hydroxy-3'-tertiary butyl-5'-tertiary butyl-benzyl)-hydroquinone-dimethylether
2,5-bis-(2'-hydroxy-3'-tertiary amyl-5'-methyl-benzyl) hydroquinone-dimethyl ether.

A further object of the invention relates to stabilized polyurethanes having incorporated 0.05 to 50.0% by weight of a stabiliser mixture consisting of (a) an alkoxy substituted, sterically hindered phenol and
(b) a 2-(2'-hydroxyphenyl)-benzotriazole for stabilising polyurethanes.

The alkoxy substituted, sterically hindered phenols which are used have the following formula:

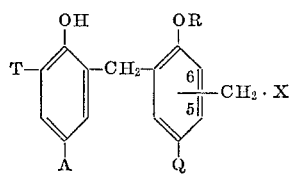

(I)

in which

T represents a tertiary alkyl group, e.g. a tertiary butyl, tertiary amyl, tertiary octyl or tertiary dodecyl radical (preferably a tertiary butyl radical);

A represents a primary or secondary alkyl radical containing 1 to 12 carbon atoms, preferably a methyl group or the same as the group T;

R represents a primary alkyl radical containing 1 to 12 carbon atoms or a benzyl radical, preferably a methyl group;

Q=A and is preferably a methyl, tertiary butyl or tertiary octyl radical or an isononyl radical or an OR radical, preferably a benzyloxy or a methoxy group;

X represents a hydrogen atom or a radical of the formula

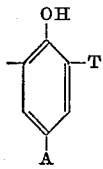

the radical —CH$_2$.X being in the 6-position when Q=alkyl and in the 5-position in the case when Q=OR.

The 2-(2'-hydroxyphenyl)-benzotriazoles used have the following formula:

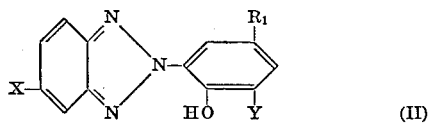

in which

X represents a hydrogen atom, an alkyl group or a halogen atom;

Y represents a hydrogen atom, an alkyl radical containing 1 to 12 carbon atoms or an alkylene radical which has hetero atoms, preferably a tertiary alkyl radical, e.g. tertiary butyl, tretiary amyl or tertiary dodecyl; and R$_1$ represents a hydrogen atom or an alkyl group containing 1 to 12 carbon atoms, e.g. methyl, ethyl, isopropyl, tertiary butyl, tertiary amyl, tertiary octyl or tertiary dodecyl.

Compounds (a) and (b) are used in proportions by weight of 1:10 to 10:1 in the mixture. This results in a synergistically active stabilisation to discolouration and degradation by light, heat and atmospheric impurities being imparted to the polyurethane elastomers.

The use of 2-(2'-hydroxyphenyl)-benzotriazoles as stabilising additives in polymers is known per se but their effect is quite inadequate when used on their own as stabiliser. A combination of 2-(2'-hydroxyphenyl)-benzotriazoles and 1,3,5-trimethyl-2,4,6-tris-(3,5-ditertiarybutyl-4-hydroxybenzyl)-benzene or 1,2,4,5-tetramethyl-3,6-bis-(3,5-ditertiarybutyl-4-hydroxybenzyl)-benzene has also been described for stabilising segmented polyurethanes in Dutch Auslegeschrift NE 6,509,745. These additives do provide a certain amount of protection but it is insufficient and the need remains for a highly effective, wash-resistant stabiliser for elastomers, especially for elastomer threads.

Compound (b) is preferably a benzotriazole of the following formula:

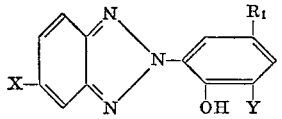

in which

X represents a hydrogen or chlorine atom;

Y represents a hydrogen atom or an alkyl group containing 1 to 12 carbon atoms, preferably a tertiary alkyl group, e.g. tertiary butyl or tertiary amyl, or an N-methylene-phthalimido radical; and R$_1$ represents a hydrogen atom or an alkyl group containing 1 to 12 carbon atoms, e.g. a methyl, ethyl, isopropyl, teritary butyl or tertiary amyl group.

The synergistic increase in effect obtained by using the stabiliser mixture instead of the same quantity of one or the other of the individual components is clear from the results given in the examples.

The great improvement in the resistance of polyurethane elastomers to discolouration and degradation which can be obtained by using alkoxy substituted, sterically hindered phenols of Formula I in combination with light protective agents of Formula II is also demonstrated by comparison tests with a corresponding combination of phenol and light protective agent in which the phenol used is 1,3,5-trimethy-2,4,6-tris-(3,5 - ditertiary butyl-4-hydroxybenzyl)-benzene.

The following compounds may be mentioned by way of example as light protective agents based on 2-(2'-hydroxyphenyl)-benzotriazole which are used as component B of the synergistic stabilizer mixture:

2-(2'-hydroxy-5'-methyl-phenyl)-benzotriazole
2-(2'-hydroxy-5'-methyl-phenyl)-chloro-benzotriazole
2-(2'-hydroxy-3'-tertiary butyl-5'-methyl-phenyl)benzotriazole
2-(2'-hydroxy-3'-tertiary butyl-5'-methyl-phenyl)-5-chloro-benzotriazole
2-(2'-hydroxy-3'-methyl-5'-tertiary butyl-phenyl)-benzotriazole
2-(2'-hydroxy-3'-methyl-5'-tertiary butyl-phenyl)-5-chloro-benzotriazole
2-(2'-hydroxy-3',5'-dimethyl-phenyl)-benzotriazole
2-(2'-hydroxy-3',5'-dimethyl-phenyl)-5-chloro-benzotriazole
2-(2'-hydroxy-3',5'-ditertiary butyl-phenyl)-benzotriazole
2-(2'-hydroxy-3',5'-ditertiary butyl-phenyl)-5-chloro-benzotriazole
2-(2'-hydroxy-3',5'-ditertiary amyl-phenyl)-benzotriazole
2-(2'-hydroxy-3',5'-ditertiary amyl-phenyl)-5-chloro-benzotriazole
2-(2'-hydroxy-3',5'-ditertiary octyl-phenyl)-benzotriazole
2-(2'-hydroxy-3',5'-ditertiary octyl-phenyl)-5-chloro-benzotriazole
2-(2'-hydroxy-3'-N-methylene-phthalimido)-benzotriazole Other suitable hydroxphenyl benzotriazoles are mentioned, for example, in German Auslegeschriften 1,213,-408; 1,213,409 and 1,213,410 and in U.S. patent specification 3,213,058.

The elastic polyurethanes which are to be stabilized and which may be in the form of foams can be produced by processes known per se from known starting materials. The polyurethanes are generally produced by reacting high molecular weight polyhydroxyl compounds (e.g. polyesters or polyethers which have a molecular weight of about 500 to 5,000 and melting points preferably below 60° C.) and aliphatic, araliphatic or aromatic polyisocyanates (preferably aromatic diisocyanates such as toluylene diisocyanate or diphenylmethane-4,4'-diisocyanate) and so-called chain lengthening agents, i.e. low molecular weight compounds (molecular weight e.g. 18 to 400) which have two or more groups which are reactive with isocyanate (e.g. low molecular weight diols, diamines, dihydrazides, hydroxyhydrazides, semicarbazide hydrazides or also water) in a single stage or multistage process in a melt or in solvents by one of many known and variable processes.

The following are given as examples of starting material: Polyesters of adipic acid and dialcohols having 2 to about 10 carbon atoms, preferably those which have more than 5 carbon atoms, the dialcohols being optionally used for lowering the melting points of the polyesters in the mixture: polyesters of caprolactone and dialcohols; furthermore, polyalkylene ether diols, especially polytetramethylene ether diols, polytrimethylene ether diols, polypropylene glycol or corresponding copolyethers. The diisocyanates used are preferably aromatic diisocyanate, araliphatic diisocyanate such as m-xylylene diisocyanate or also aliphatic diisocyanates such as hexamethylene diisocyanate and dicyclohexylmethane-4,4'-diisocyanate. Suitable chain lengthening agents are water, dihydric or trihydric such as butane diol and/or p-xylylene glycols, trimethylol propane, diamines such as diphenylmethane-4,4'-diamine or 3,3'-dichloro-diphenylmethane-4,4'-diamine, isophorone diamine, metaxylylene diamine as well as hydrazine or di-hydrazides such as carbodihydrazide, oxalic acid dihydrazide malonic acid dihydrazide, terephthalic acid dihydrazide or semicarbazide-hydrazides such as β-semicarbazido-alanyl hydrazide.

The polyurethanes which are to be stabilized are preferably of the type which in addition to containing urethane groups also contain NH—CO—NH groups produced by reacting isocyanate groups with water or with compounds containing terminal $NH_2$ groups (e.g. diamines, dihydrazides, carbodihydrazide or hydrazine) and which have a substantially linear, segmented molecular structure, are soluble in highly polar solvents such as dimethylformamide or dimethylacetamide and the characteristic segments of which can be represented by the following group.

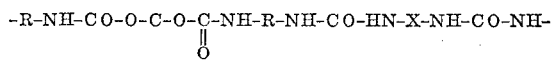

In this formula, R represents a divalent aliphatic, araliphatic or aromatic radical derived from a diisocyanate, G represents the radical of high molecular weight polyhydroxyl compound of molecular weight 500 to 5,000 and melting point below 60° C. without its terminal hydroxyl groups (e.g. radical of a polyalkylene ether, polyester, polyacetal or poly-N-alkyl urethane) and X represents the radical of a divalent chain lengthening agent which has terminal $NH_2$ groups without the terminal $NH_2$ groups e.g. an aliphatic, araliphatic, aromatic or heterocyclic radical, an

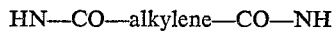

radical, an NH—CO—NH—$(CH_2)_2$—CO—NH radical or a bond between two N atoms. The synthesis of such polyurethane (ureas) has been described in detail in German Auslegeschrift 1,270,276. Polyurethane foams can be produced by known processes and according to known recipes (see e.g. Kunstsoff-Handbuch, volume VII, polyurethane, Publishers Carl Hanser Verlag Munich, 1966, pages 440 to 457, 504 to 531) e.g. with the addition of the stabilizers to the starting components (e.g. polyethers).

The stabilizers can be incorporated in the polyurethanes by any method suitable for the technical requirements of process. The simplest method consists in adding the stabilizers, if desired in solution, to solutions of the polyurethanes, e.g. to solution in highly polar solvents such as dimethylformamide or dimethylsulphoxide which are advantageously used for spinning, coating or coagulation purposes. The stabilizers may, however, also be incorporated in melts or plasticized polyurethane sheets by means of suitable mixing devices such kneaders or rollers. Elastomer threads may have the stabilizers applied to the surface together with the dressing.

It is also possible to add the stabilizers to the starting materials used for the production of polyurethanes and only then carrying out the polyurethane synthesis. Thus alkoxy-substituted compounds are soluble in higher molecular weight polyhydroxyl compounds such as polyesters or polyethers. Suitable polyurethane syntheses, e.g. for the production of foams or elastomers, can then be carried out with such stabilizer-containing polyesters or polyethers. The stabilizers may also be added to the diisocyanates or to the NCO-terminated prepolymers produced from higher molecular weight polyhydroxyl compounds and (excess molar quantities) of diisocyanates, before the polyurethane is produced, e.g. by spinning it into aqueous diamine solutions. Discoloration of the polyurethanes can be prevented during synthesis by adding stabilizers during the reaction of NCO prepolymers with chain lengthening agents such as diamines, hydrazine, hydrazides or similar chain lengthening agents in highly polar solvents such as dimethylformamide or dimethylacetamide. The amount of stabilizers to be added is 0.05 to 10% by weight, preferably 0.2 to 3.0% by weight based on the solid polyurethane substance.

A further increase in the light protective effect is observed by adding the stabilizers according to the invention to polyurethane which contain reaction components having tertiary, aliphatically substituted amino groups in quantities of 0.02 to 1 mol and preferably 0.05 to 0.3 mol per kilogram of elastomer substance. Examples of such reaction components are glycols, diamines, dihydrazides and polyesters or polyethers with tertiary amino groups e.g. N,N' - bis - (β-hydroxy-propyl)-methylamine, N,N'-bis-(β-hydroxyethyl)-piperazine, N,N' - dimethyl, N,N'-bis-(γ-aminopropyl)-ethylene diamine, N,N'-bis-(γ-amino-propyl)-piperazine or polyethers containing tertiary amino groups or polyesters containing tertiary amino groups which are prepared by using dialcohols which contain tertiary amino groups.

PREPARATION OF THE ALKOXY SUBSTITUTED, STERICALLY HINDERED PHENOLS

A 2-tertiary-alkyl-4-alkyl-phenol is condensed with an alkoxybenzene which contains one or two hydroxymethyl groups in the ortho-position to the alkoxy group in an organic solvent in the presence of catalytic quantities of a strong acid. The strong acid may be, e.g. p-toluenesulphonic acid, phosphoric acid, sulphuric acid or hydrochloric acid or a strongly acid ionic exchanger. The water produced on condensation may, if desired be removed by azeotropic distillation. Suitable solvents are, for example, benzene, toluene, cleaning petrol, cyclohexane, methanol, ethanol, glacial acetic acid, dioxane or chlorinated hydrocarbons such as chloroform or ethylene chloride.

A preferred, general method of carrying out the condensation is described below:

The mixture of a 2-tertiary alkyl-phenol and an o-hydroxymethyl alkoxy-benzene is heated to boiling in a water separator in the presence of catalytic quantities of strong acid, such as p-toluene-sulphonic acid in an organic solvent which is immiscible with water, e.g. toluene, until water ceases to be split off. The hydroxymethyl compound may be introduced in solid form, as a solution or as a melt in small portions over a relatively long period into the boiling reaction mixture. The reaction product is generally precipitated in crystalline form on cooling and is worked up in the usual manner e.g. by filtration or recrystallisation.

The alkoxybenzenes with one or two hydroxymethyl groups are known or can be prepared by analogous processes.

PREPARATION OF 4 - METHYL - 2,6 - BIS - (2'-HYDROXY - 3' - TERTIARY-BUTYL - 5' - METHYL-BENZYL)-ANISOLE (STABILIZER A)

A solution of 200 g. (1.22 mol) of 2-tertiary-butyl-p-cresol and 1 g. of p-toluenesulphonic acid in 500 ml. of toluene is heated to boiling in a water separator. A solution of 100 g. (0.55 mol) of 1-methoxy-4-methyl-2,6-dihydroxy-methyl-benzene in 150 ml. of toluene heated to 100° C. is then slowly introduced dropwise in the course of 6 hours. The reaction mixture is then heated to boiling for a further 3 hours and 1.3 litres of light petrol is then added at about 80° C., the solution is cooled and after it has left to stand for several hours the crystals which separate are removed by suction filtration.

88 g. of the following compound (Stabilizer A)

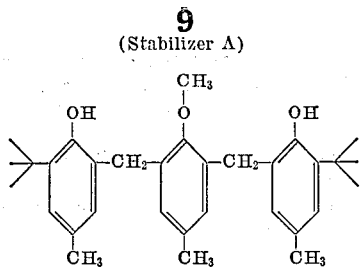

are obtained in the form of colourless crystals, M.P. 188–190° C.

A further 24 g. of M.P. 188–189° C. are obtained by concentrating the filtrate by evaporation.

The substances mentioned in the following Table 1 were prepared by an analogous procedure after reacting the given starting materials in the given molar ratios.

(1.88% NCO) are introduced in the course of 4 minutes, with rapid stirring, into a fresh suspension prepared by adding 15 parts of solid carbon dioxide to a solution of 5.93 parts of ethylene diamine in 898 parts of dimethylformamide, a homogeneous, viscous, slightly yellowish elastomer solution being obtained. This solution is pigmented by the addition of 4% by weight (based on the solid elastomer substance) of titanium dioxide (rutile). Portions of this elastomer solution (viscosity 423 poises) with and without stabilizer are converted into films in the usual manner and these films are cut up into threads which are then exposed to UV light (Fade-Ometer) (see Table 2).

In a similar reaction to that described in the above Example, 2% by weight of stabilizer A (6.52 parts) were not added subsequently to the finished elastomer solution (see above) but dissolved in dimethylformamide

TABLE 1

| Stabilizer | Starting materials | Molar ratios, approximate | Melting point, ° C. of stabilizers |
|---|---|---|---|
| B | (structures) | 2:1 | 914–197 |
| C | (structures) (Kp. 145–147°/14 torr) | 1:1 | 119–120 |
| D | (structures) (Fp. 104–106°) | 1:1 | 172 |
| E | (structures) (Fp. 162–163°) | 2:1 | 226 |

NOTE.—+=tert. Butyl; ++=tert. Octyl.

Example 1

800 parts of a polytetramethylene ether diol (molecular weight 1,010), 17.4 parts of N,N-bis-(β-hydroxypropyl)-N-methylamine, 306.6 parts of diphenylmethane-4,4'-diisocyanate and 284 parts of chlorobenzene are heated to 65–75° C. for 52 minutes and then cooled at room temperature. 400 parts of this NCO prepolymer solution together with the ethylene diamine, and the elastomer solution was then prepered from the NCO prepolymer. A homogeneous, viscous, completely colourless elastomer solution which did not discolour even on exposure to air was obtained. After the solution had been cast to form films and the threads had been exposed to light, a practically identical stabilizing effect against mechanical degradation under exposure to light was measured.

TABLE 2

| Stabilizer | Before exposure to light | | 22 hours | | 44 hours | | 66 hours | | 88 hours | |
|---|---|---|---|---|---|---|---|---|---|---|
| | Tensile strength, g./denier | Elongation, percent | Tensile strength, g./denier | Elongation, percent | Tensile strength, g./denier | Elongation, percent | Tensile strength, g./denier | Elongation, percent | Tensile strength, g./denier | Elongation, percent |
| Without the addition of stabilizer. | 0.60 Discoloration: almost colourless | 584 | <0.03 Yellow | <100 | Not measurable Yellowish brown | | Yellowish brown | | Yellowish brown | |
| Plus 2% stabilizer A | 0.60 Discolouration: colourless | 585 | 0.60 Colourless | 586 | 0.59 Almost colourless | 587 | 0.58 Almost colourless | 580 | 0.18 Slightly yellowish | 330 |

Example 2

6,500 parts of a copolyester (molecular weight 1660) of adipic acid and the diol mixture of 1,6-heanediol and 2,2-dimethylpropanediol in the molar ratio of 65:35 are first dehydrated for one hour at 130° C./10 mm. Hg, and 129 parts of N,N-bis-(β-hydroxypropyl)-N-methylamine and 1,782 parts of diphenylmethane-4,4'-diisocyanate are then added thereto at 55° C. and the reaction mixture is then heated in a boiling water bath (about 70 minutes) until the NCO content of the NCO prepolymer melt is 2.2%.

820 g. of a 33% titanium dioxide paste is introduced into a solution, heated to about 80° C., of 297.5 parts of β-semicarbazidoalanylhydrazide

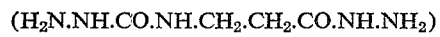

in 18,813 parts of dimethylformamide, and thereafter 6,460 parts of the NCO prepolymer melt are stirred into this mixture, a fairly viscous elastomer solution (615 poises/20° C.) being obtained.

Different portions of the elastomer solution are treated with different stabilizers according to the invention or with comparison substances and exposed in part in the Fade-Ometer in the form of elastomer films (see Table 3) and in part exposed in the Fade-Ometer after they have been spun into elastomer threads, and the mechanical degradation of the threads is determined (see Table 4).

Comparison tests with a stabilizer which contains a cycloalkyl radical (compound F) instead of the tertiary alkyl radicals:

| Stabilizer | Discoloration after exposure in the Fade-Ometer for— | | |
|---|---|---|---|
| | 480 minutes | 900 minutes | 1,440 minutes |
| 2% Compound F | Almost colourless. | Yellowish | Intensely yellow |

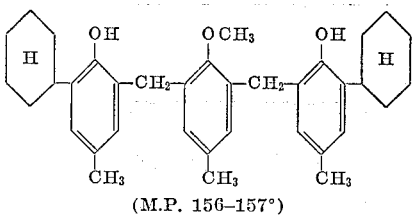

(M.P. 156–157°)

It is clear from the results given in the table that the alkoxy substituted, sterically hindered phenols according to the invention have a very good stabilizing action which exceeds that of known efficient stabilizers. If the tertiary alkyl group in the stabilizers according to the invention is replaced e.g. by a cyclohexyl group, the stabilizing effect on polyurethanes, which effect is free from discoloration, is lost.

TABLE 4

Mechanical degradation of elastomer threads (individual titre approximately 12 denier) after Fade-Ometer exposure

| | Before exposure | | 480 minutes | | 900 minutes | | 1,440 minutes | |
|---|---|---|---|---|---|---|---|---|
| | Tensile strength, g./denier | Elongation at break, percent | Tensile strength, g./denier | Elongation at break, percent | Tensile strength, g./denier | Elongation at break, percent | Tensile strength, g./denier | Elongation at break, percent |
| Without stabilizer | 0.54 | 400 | 0.41 | 350 | 0.12 | 175 | | |
| 2% Stabilizer A | 0.55 | 370 | 0.50 | 350 | 0.42 | 340 | 0.33 | 330 |
| 2% Stabilizer A, but threads washed for 3 hours [1] | 0.55 | 400 | 0.51 | 370 | 0.46 | 385 | 0.30 | 300 |
| 2% Stabilizer according to DAS 1,243,866 | 0.55 | 400 | 0.47 | 400 | 0.33 | 335 | 0.34 | <300 |

[1] Treated for 3 hours in a solution of 5 g./l. of soap plus 2 g./l. of soda at 60° C.

Spinning was carried out by the dry spinning process by extruding the elastomer solution through a nozzle having 16 apertures of 0.2 mm. diameter into a heated shaft (220 to 230° C.) and drawing off the threads at a rate of about 100 m./min. and winding them at about 130 m./min. Threads (total titre about 190 den.) were then tempered for one hour at 130° C.

TABLE 3

| Stabilizer | Discoloration after exposure in the Fade-Ometer for— | | |
|---|---|---|---|
| | 480 minutes | 900 minutes | 1,440 minutes |
| Without additive | Almost colourless. | Yellow brown | Yellow brown. |
| 2% Stabilizer according to DAS 1 243 866. | do | Yellowish | Yellow. |
| 0.5% Stabilizer A | Colourless | Colourless | Colourless. |
| 2% Stabilizer A | do | do | Do. |
| 2% Stabilizer B | do | do | Almost colourless. |
| 2% Stabilizer C | do | do | Do. |
| 2% Stabilizer D | do | do | Do. |
| 2% Stabilizer E | do | do | Yellowish. |

Example 3

1,000 parts of a polytetramethylene ether diol (OH number 111), 20.6 parts of N,N-bis(β-hydroxypropyl)-N-methylamine, 369 parts of diphenylmethane-4,4'-diisocyanate and 349 parts of chlorobenzene are heated at 65 to 70° C. for 50 minutes to form the NCO prepolymer. After cooling, the NCO content is 1.69%.

5.27 parts of ethylene diamine are dissolved in 895 g. of DMF and treated with 13 parts of very finely divided pigment (rutile) followed by 15 parts of solid carbon dioxide.

400 parts of the NCO prepolymer solution are stirred into this suspension in the course of a few minutes, an elastomer solution having a viscosity of 565 poises/20° C. being obtained. Portions of the solution were treated with 2% of stabilizer A and B, respectively, and suitable known comparison substances which had a free hydroxyl group instead of a methoxy group. Films were produced in known manner from portions of the solution with and without stabilizer and exposed in the Fade-Ometer (see Table 5).

The results show that the new stabilizers are greatly superior since they do not give rise to any discoloration on exposure to light. Although the known compounds may also delay the mechanical degradation to some extent, they undergo severe discoloration in the process and are therefore unsuitable for colourless articles such as foils or threads.

(1.9% NCO) are stirred together with a solution of 38.7 parts of 4,4'-diamino-diphenyl methane in 1,872 parts of dimethyl-formamide, and after 12 hours 3.38 parts of diphenylmethane - 4,4' - diisocyanate are added, a viscous elastomer solution (102 poises/20° C.) being obtained which is treated with 1 part of acetic anhydride per 100 parts of solution. The solution is pigmented by the addition of 4% of titanium dioxide (rutile) based on the amount of solid elastomer substance.

TABLE 5

| Without stabilizer | Properties of the foils according to 22 hours of exposure in the Fade-Ometer | |
|---|---|---|
| | Foils discoloured yellow | Foils have undergone complete degradation |
| 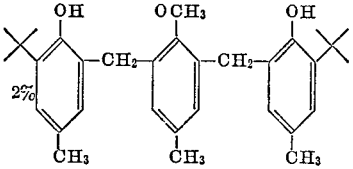 (Stabilizer A) | Foils-colourless | Mechanical strength preserved. |
| 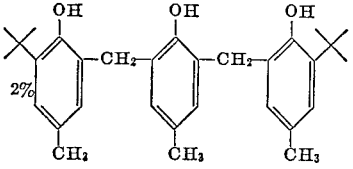 (Comparison substance) | Foils-yellow brown. | Mechanical strength substantially preserved. |
| 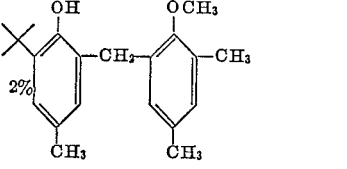 (Stabilizer C) | Foils-colourless | Mechanical strength preserved. |
| 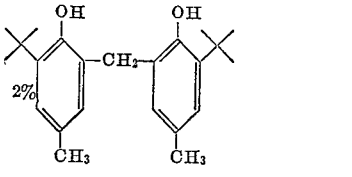 (Comparison substance) | Foils-intense yellow to yellow brown. | Mechanical strength substantially preserved. |
| 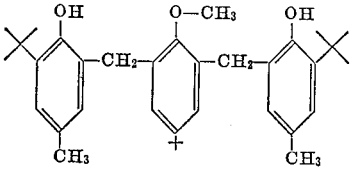 (Stabilizer B) | Foils-colourless | Mechanical strength preserved. |

Example 4

800 parts of a polytetramethylene ether diol (OH number 111) are heated to 65 to 70° C. for 50 minutes with 17.4 parts of N,N-bis-(β-hydroxypropyl)-N-methylamine, 306.6 parts of diphenylmethane-4,4'-diisocyanate and 284 parts of chlorobenzene and then cooled to room temperature. 800 parts of the resulting NCO prepolymer solution Portions of the above elastomer solution are treated with 2% of stabilizer A according to the invention.

The elastomer solutions, with and without stabilizer, are painted on glass plates and dried at 100° C. for 60 minutes. The elastomer films, which are about 0.15 to 0.20 mm. in thickness, are cut up into threads of about 300 den. with a foil cutting machine and then exposed to U.V. light in an Atlas Fade-Ometer for 0.22 and 66 hours.

TABLE 6

| Stabilizer | Before exposure | | 22 hours | | 44 hours | |
|---|---|---|---|---|---|---|
| | Tensile strength, g./denier | Elongation at break, percent | Tensile strength, g./denier | Elongation at break, percent | Tensile strength, g./denier | Elongation at break, percent |
| Without the addition of stabilizer | 0.65 Discoloration: almost colourless | 600 | <0.05 Yellow brown | 142 | No longer measurable Yellow brown | |
| 2% Stabilizer A | 0.66 Discoloration: colourless | 605 | 0.60 Colourless | 620 | 0.53 Colourless | 621 |

Example 5

800 parts of a polytetramethylene ether diol (OH number 111) are heated together with 18.0 parts of N,N-bis-(β - hydroxy-propyl)-N-methylamine, 394.5 parts of diphenylmethane-4,4′-diisocyanate and 304 parts of chlorobenzene at 80° C. for 40 minutes, an NCO prepolymer being formed which contained 3.58% of NCO after it had cooled to room temperature.

Elastomer solution I.—404 parts of the NCO prepolymer solution and 3.30 parts of water in 889 parts of dimethylformamide are stirred together at room temperature, the solution becoming yellow after about one hour and a highly viscous, deep yellow elastomer solution being obtained after 24 hours. When the solution is spun by the usual dry spinning process, yellow elastomer threads are obtained.

Elastomer solution II.—404 parts of the NCO prepolymer solution, 3.30 parts of water and 6.4 parts of stabilizer A (2% by weight) in 890 parts of dimethylformamide are stirred together at room temperature, a highly viscous, completely colourless elastomer solution being obtained after 24 hours, this solution yielding colourless elastomer threads when spun by conventional dry spinning processes, which threads also have substantially better stability against discoloration and mechanical degradation when exposed to light or treated with hot air than the threads from elastomer solution I.

If elastomer solution I is treated with 2% by weight of stabilizer A, slightly coloured elastomer threads are obtained which are substantially more stable on exposure to light and treatment with hot air (e.g. one hour at 150° C.) than the threads obtained from elastomer solution I without the addition of stabilizer.

Example 6

800 parts of polytetramethyleneether diol, molecular weight 1,010, are heated at 70° C. for 40 minutes with 17.35 parts of N,N-bis-(β-hydroxypropyl)-methylamine, 326.5 parts of diphenylmethane-4,4′-diisocyanate and 287 parts of chlorobenzene to form the NCO prepolymer. By stirring 408 parts of the prepolymer into a solution, heated to about 60° C., of 10.7 parts of carbodihydrazide in 960 parts of dimethylformamide, a highly viscous (600 poises) elastomer solution is obtained. A part of this solution is treated with 1% by weight of stabilizer A (based on the amount of solid substance) and another part is left without stabilizer. Films obtained from the solutions yield the following values after exposure in the fadeometer:

TABLE 7

[Tensile strength (in g./denier after fadeometer exposure (in hours)]

| 0 | 22 | 44 | 66 |
|---|---|---|---|
| Without additive 0.68 | 0.27 | No longer measurable | |
| Plus 1% Stabilizer A 0.68 | 0.69 | 0.48 | 0.30 |

Example 7

800 parts of a polytetramethylene ether diol (molecular weight 1010), 17.4 parts of N,N-bis-(β-hydroxypropyl)-N-methylamine, 306.6 parts of 4,4′-diphenylmethane-4,4′-diisocyanate and 284 parts of chlorobenzene are heated to 65 to 70° C. for 52 minutes and then cooled to room temperature. 400 parts of this NCO prepolymer solution (1.88% NCO) are introduced with rapid stirring in the course of 4 minutes into a fresh suspension prepared by adding 15 parts of solid carbon dioxide to a solution of 5.93 parts of ethylene diamine in 898 parts of dimethylformamide, a homogeneous, viscous slightly yellowish elastomer solution is obtained. This solution is pigmented by the addition of 4% by weight (based on solid elastomer substance) of titanium dioxide (rutile). Different portions of the elastomer solution (viscosity 423 P) with and without the addition of stabiliser are converted into films as described in Example 4, and these films are cut up into threads which are then exposed to UV light (Fade-Ometer) (see Table 8).

In a similar reaction as in the above example, the 2% by weight of stabiliser were not added subsequently to the finished elastomer solution (see above) but dissolved in dimethylformamide together with the ethylene diamine, and the elastomer solution was then prepared from the NCO prepolymer. A homogeneous, viscous, completely colourless elastomer solution was obtained which was not discoloured even on exposure to air. After the solution had been cast into films and the threads had been exposed, the stabilising effect against mechanical degradation under exposure to light was found to be practically identical.

TABLE 8

| Stabiliser | Initially | | 22 hours | | 44 hours | | 66 hours | | 88 hours | |
|---|---|---|---|---|---|---|---|---|---|---|
| | Tensile strength g./denier | Elongation percent | Tensile strength, g./denier | Elongation percent | Tensile strength, g./denier | Elongation percent | Tensile strength, g./denier | Elongation percent | Tensile strength, g./denier | Elongation percent |
| Without the addition of stabiliser. | 0.60 Discolouration: almost colourless | 584 | 0.03 Yellow | 100 | Not measurable Yellow brown | | Yellow brown | | Yellow brown | |
| Plus 2% Stabiliser A (Component a) of the synergistic mixture). | 0.60 Discolouration: colourless | 585 | 0.60 Colourless | 586 | 0.59 Almost colourless | 587 | 0.58 Almost colourless | 580 | 0.18 Pale yellowish | 330 |
| Plus 2% 2-(2′hydroxy-3′-tertiary butyl-5′-methyl-phenyl)-5-chlorobenzo-triazole (Component b) of the synergistic mixture). | Colourless | | 0.39 Yellowish | 526 | No longer measurable Yellow | | | | | |
| Plus 1% stabiliser A plus 1% 2-(2′-hydroxy-3′-tertiary butyl-5′-methyl-phenyl)-5-chlobenzo-triazole (synergistic mixture). | Colourless | | 0.71 Colourless | 604 | 0.60 Colourless | 570 | 0.59 Colourless | 546 | 0.50 Colourless | 534 |
| Plus 1% IONOX 330 plus 1% 2-(2′hydroxy-3′-tertiary butyl-5′-methylphenyl)-5-chloro-benzotriazole (mixture according to Dutch 6,509,745). | Colourless | | 0.69 Colourless | 573 | 0.58 Colourless | 550 | 0.52 Colourless | 540 | 0.20 Yellowish | 385 |

Example 8

Preparation of the polyurethane.—6500 parts of a mixed polyester (molecular weight 1660) of adipic acid and the diol mixture of 1,6-hexanediol and 2,2-dimethyl-propanediol in the molar ratio of 65:25 are dehydrated for one hour at 130° C./10 mm. Hg, and 129 parts of N,N-bis-(β-hydroxypropyl)-N-methylamine and 1782 parts of diphenylmethane-4,4′-diisocyanate are then added at 55° C. and the reaction mixture is heated in a boiling water bath (about 70 minutes) until the NCO content of the NCO prepolymer melt is 2.22%.

820 g. of a 33% titanium dioxide paste are introduced into a hot solution of 297.5 parts of β-semicarbazido-alanyl-hydrazide

($H_2N.NH.CO.NH.CH_2.CH_2.CO.NH.NH_2$)

in 18813 parts of dimethylformamide at approximately 80° C., and 6460 parts of the NCO prepolymer melt are then stirred in, a highly viscous elastomer solution being formed (650 poises/20° C.).

Digerent stabilisers according to the claim of the invention and comparison substances are then added to different portions of the elastomer solution, and after the solution has been spun into elastomer threads, the threads are exposed in a Fade-Ometer and their mechanical degradation is determined (see Table 9). Spinning was carried out by the dry spinning process, the elastomer solution being extruded through a nozzle which had 16 apertures of 0.2 mm. diameter into a heated shaft (220 to 230° C.), the threads being drawn off at a rate of about 100 m./min. and wound at the rate of about 130 m./min. The threads (total titre about 190 den.) were then tempered at 130° C. for one hour.

TABLE 9

| | Mechanical degradation of elastomer threads (individual titre about 12 denier) after fadeometer exposure | | | | | | | | |
|---|---|---|---|---|---|---|---|---|---|
| | Initially | | 480 minutes | | 900 minutes | | 1440 minutes | | |
| | Tensile strength, g. denier | Elongation at break, percent | Tensile strength, g./denier | Elongation at break, percent | Tensile strength, g./denier | Elongation at break, percent | Tensile strength, g./denier | Elongation at break, percent | |
| Without stabiliser | 0.54 | 400 | 0.41 | 350 | 0.12 | 175 | | | |
| 2% stabiliser A | 0.55 | 370 | 0.50 | 350 | 0.42 | 340 | 0.33 | 330 | |
| 2% 3-(2′-hydroxy-3′,5′-ditertiary butylphenyl)-5-chlorobenzotriazole | | | 0.42 | 340 | 0.15 | 195 | | | |
| 1% stabiliser A plus 1% 2-(2′-hydroxy-3′,5′-ditertiary-butylphenyl)-5-chlorobenzotriazole (synergistic mixture) | 0.64 | 400 | 0.62 | 390 | 0.52 | 385 | 0.50 | 350 | |
| 1% stabiliser according to DAS 1,243,866 plus (LONOX 330) 1% (comparison test according to Dutch 6,509,745) | 0.55 | 400 | 0.54 | 400 | 0.44 | 335 | 0.28 | 310 | |
| Synergistic mixture after washing [1] | | | 0.64 | 390 | 0.54 | 353 | 0.35 | 315 | |
| Comparison test according to Dutch Patent 6,509,745 after washing [1] | | | 0.42 | 340 | 0.36 | 310 | 0.12 | 190 | |

[1] After a washing treatment (3 hours in a solution of 5 g./l. soap plus 2 g./l. soda at 60° C.) the following values are obtained for the synergistic mixture and the mixture used in the comparison test according to Dutch Patent 6,509,745, demonstrating the increased wash resistance of the synergistic mixture according to the invention.

The results show that the mixture of compounds (a) and (b) has a synergistic effect compared to the individual compounds of the same concentration and that the stabilising effect is distinctly better than that of known stabiliser in Table 1 by (B), (C) and (D), and light protective agents (b) such as 2-(2'-hydroxy-3',5-ditertiary-amylphenyl)-benzotriazole or 2-(2'-hydroxy-5-methylphenyl)-benzotriazole in proportions of 2:1 to 1:2.

TABLE 10

| Additives | Fadeometer exposure | |
|---|---|---|
| | 22 hours | 44 hours |
| None | Foils yellow, complete mechanical degradation | Foils yellow brown destroyed. |
| 2% Stabiliser A (Component a) | Foil colourless, mechanical strength maintained. | Foil almost colourless, strength substantially maintained. |
| 2% 2-(2'-hydroxy-3',5'-ditertiary butylphenyl)-5-chlorobenzotriazole (Component b). | Foil yellowish, substantial mechanical degradation. | Foil yellow, mechanical degradation. |
| 1% Stabiliser A plus 1% 2-(2'-hydroxy-3',5'-ditertiary butylphenyl)-5-chloro-benzotriazole (synergistic mixture). | Foil colourless, mechanical strength maintained. | Foil colourless, mechanical strength maintained. |
| 2% Stabiliser E (Component a) | Foil yellowish, mechanical strength largely maintained. | |
| 1% Stabiliser E plus 1% 2-(2'-hydroxy-3',5'-ditertiary butylphenyl)-5-chloro-benzotriazole (synergistic mixture). | Foil colourless, mechanical strength maintained. | Foil yellowish, mechanical strength largely maintained. |
| 2% 2-(2'-hydroxy-3'-N-methylene-phthalimido)-benzotriazole (Component b). | Foil yellowish, mechanical strength substantially maintained. | Foil yellow, mechanical degradation. |
| 1% Stabiliser E plus 1% 2-(2'-hydroxy-3'-N-methylene-phthalimido)-benzotriazole (synergistic mixture). | Foil colourless, mechanical strength maintained. | Foil almost colourless, mechanical strength substantially maintained. | mixtures (e.g. according to Dutch Patent 6,509,745) and that it is better preserved after washing.

Example 9

Preparation of the polyurethane solution.—1,000 parts of a polytetramethylene ether diol (OH number 111), 20.6 parts of N,N-bis-(β-hydroxypropyl)-N-methylamine, 369 parts of diphenylmethane-4,4'-diisocyanate and 349 parts of chlorobenzene are heated to 65 to 70° C. for 50 minutes to form the NCO prepolymer. After cooling, the NCO content is 1.69%.

5.27 parts of ethylene diamine are dissolved in 895 g. of DMF and treated with 13 parts of very finely divided pigments (rutile) followed by 15 parts of solid carbon dioxide. 400 parts of the NCO prepolymer solution are stirred into this suspension within a few minutes, an elastomer solution having a viscosity of 565 poises/20° C. being formed. Portions of the solution were treated with 2% of phenol stabilisers (a) or light protective agent or 2% of the synergistic mixture of (a) and (b) or the mixture according to Dutch Patent 6,509,745. Films were produced in known manner from portions of solution with and without stabiliser, and these films were exposed in a fadeometer (see Table 10).

The results show that the new stabiliser mixture provide substantially better protection against discolouration and mechanical degradation than the individual components.

Similar good results are obtained by using 2% of mixtures of the phenol stabilisers (a) which are indicated

Example 10

800 parts of a polytetramethylene ether diol (OH number 111) are heated to 65 to 70° C. for 50 minutes with 17.4 parts of N,N-bis-(β-hydroxypropyl)-N-methylamine, 306.6 parts of diphenylmethane-4,4'-diisocyanate and 284 parts of chlorobenzene and then cooled to room temperature. 800 parts of the NCO prepolymer solution obtained (1.9% NCO) are stirred together with a solution of 38.7 parts of 4,4'-diamino-diphenylmethane in 1872 parts of dimethylformamide, and after 12 hours, 3.38 parts of diphenylmethane-4,4'-diisocyanate are added, a viscous elastomer solution (102 poises/20° C.) being obtained to which 1 part of acetic anhydride per 100 parts of solution is added. The solution is pigmented by the addition of 4% titanium dioxide (rutile) based on the amount of solid elastomer substance.

Portions of the above elastomer solution are treated with 2% of the stabilizer mixture according to the invention and for comparison with 2% of components (a) and (b) and the mixture according to Dutch Patent 6,509,745.

The elastomer solutions with and without stabiliser are painted on glass plates and dried at 100° C. for 60 minutes. The elastomer films which are about 0.15 to 0.20 mm. thick are cut up into threads of about 300 den. with a foil cutting machine and then exposed to UV light in an ATLAS Fade-O-meter for 0, 22, 44 and 66 hours (Table 11).

TABLE 11

| | Initially | | 22 hours | | 44 hours | | 66 hours | |
|---|---|---|---|---|---|---|---|---|
| | Tensile strength, g./denier | Elongation at break, percent | Tensile strength, g./denier | Elongation at break, percent | Tensile strength, g./denier | Elongation at break, percent | Tensile strength, g./denier | Elongation at break, percent |
| Without stabiliser | | | 0.05 Yellow brown | | Yellow brown | | Brownish yellow | |
| 2% Stabiliser A (part component of the synergistic mixture) | 0.66 | 605 | 0.60 Colourless | 620 | 0.53 Colourless | 621 | 0.17 Colourless | 400 |
| 2% 2-(2'-hydroxy-3'-tertiary butyl-5'-methylphenyl)-5-chloro-benzotriazole (part component of the synergistic mixture | 0.66 | 610 | 0.16 Yellowish | | No longer measurable | | | |
| 1% Stabiliser A plus 1% 2-(2'-hydroxy-3'-tertiary butyl-5'-methylphenyl)-5-chlorobenzotriazole (synergistically active mixture) | 0.66 | 620 | 0.67 Colourless | 621 | Yellowish 0.68 Colourless | 604 | Yellow 0.53 Colourless | 610 |
| 1% IONOX 330 plus 1% 2-(2'-hydroxy-3'-tertiary butyl-5'-methylphenyl)-5-chloro-benzotriazole (comparison test according to Dutch 6,509,745) | 0.65 | 610 | 0.54 Colourless | 605 | 0.33 | 604 | 0.16 Yellowish | 387 |

NOTE.—The synergistic mixute is shown to be effective for much longer than the individual components and is distinctly superior to the stabiliser mixture according to Dutch 6,509,745.

Example 11

800 parts of a polytetramethylene ether diol (OH number 111) are heated to 80° C. for 40 minutes with 18.0 parts of N,N-bis-(β-hydroxypropyl)-N-methylamine, 394.5 parts of diphenylmethane-4,4'-diisocyanate and 304 parts of chlorobenzene, and NCO prepolymer being formed which contains 3.58% of NCO after cooling to room temperature.

Elastomer solution I.—404 parts of the NCO prepolymer solution are stirred together with 3.30 parts of water in 889 parts of dimethylformamide at room temperature, the solution turns yellow after about one hour and a highly viscous elastomer solution with a strong yellow colour being obtained after 24 hours. When the solution is spun by the usual dry spinning process, yellow elastomer threads are obtained.

Elastomer solution II.—404 parts of the NCO prepolymer solution are stirred together with 3.30 parts of water and 4.87 parts of stabiliser A (1.5% by weight) and 1.63 parts (0.5% by weight) of the light protective agent 2-(2'-hydroxy-3',5'-ditertiary-amyl-phenyl)-benzotriazole in 890 parts of dimethylformamide at room temperature, a highly viscous, completely colourless elastomer solution being obtained after 24 hours, which solution yields colourless elastomer threads when spun by the usual dry spinning process, which elastomer threads are also much more stable against discolouration and mechanical degradation on exposure to light or treatment with hot air than the threads from elastomer solution I.

If elastomer solution I is treated with 2% by weight of the mixture of 1.5% of stabiliser A and 0.5% light protective agent (see above), slightly coloured elastomer threads are obtained which are much more stable on exposure to light or hot air treatment (e.g. one hour at 150° C.) than the threads from elastomer solution I without the addition of stabiliser.

Example 12

800 parts of polytetramethylene ether diol, molecular weight 1010, are heated with 297 parts of diphenylmethane-4,4'-diisocyanate and 223 parts of chlorobenzene for 38 minutes at 80° C. to form the NCO prepolymer. By stirring 419 parts of the prepolymer into an approximately 60° C. hot solution of 11.56 parts of carbodihydrazide in 916 parts of dimethylformamide, a highly viscous elastomer solution (552 poises) is obtained which is pigmented with 4% TiO$_2$. A part of this solution is treated with 1% by weight of stabiliser A (based on solid substance) and another part is left without stabiliser. Films obtained from the solutions show the following properties after exposure in the Fadeometer:

TABLE 12

| | Tensile strength (in g./denier) after Fadeometer exposure (in hours)— | | | | |
|---|---|---|---|---|---|
| | 0 | 22 | 44 | 66 | 88 |
| Without additive | 0.68 | 0.27 | No longer measurable | | |
| Plus 2% Stabiliser A | 0.70 | 0.69 | 0.30 | 0.27 | |
| Plus 1% Stabiliser A plus 1% 2-(2'-hydroxy-3'-tertiary butyl-5'-methylphenyl)-5-chloro-benzotriazole | 0.70 | 0.69 | 0.61 | 0.59 | 0.52 |

What we claim is:

1. Stabilized polyurethane elastomers having incorporated .05 to 10% by weight based on the polyurethane of an alkoxy substituted, sterically hindered phenol selected from the group consisting of

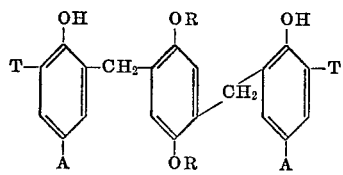

and

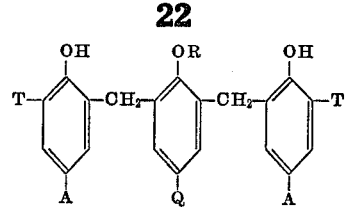

and

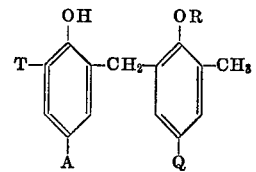

wherein
T is a C$_4$ to C$_{12}$ tertiary alkyl group;
A is a primary or secondary alkyl group having 1–12 carbon atoms or the radical T;
R is a C$_1$ to C$_{12}$ primary alkyl group or the benzyl radical; and
Q is a T or an A radical
as stabilizing agent.

2. Stabilized polyurethane elastomers having incorporated 0.05 to 10% by weight—based on the polyurethane — of an alkoxylated, sterically hindered phenol of the formula

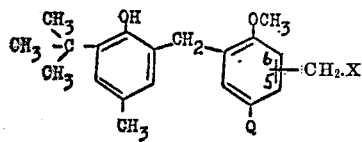

in which
Q is a primary alkyl radical having 1 to 8 carbon atoms or
a methoxy group and
X denotes a radical of the formula

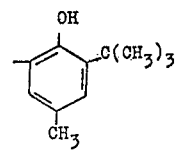

as stabilizing agent.

3. Polyurethane elastomer fibers having incorporated therein 0.5–10% by weight based on the polyurethane of a stabilizer selected from the group consisting of

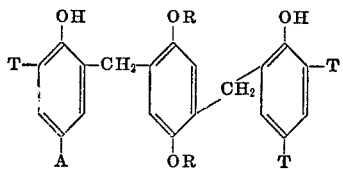

and

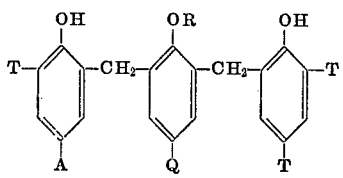

and

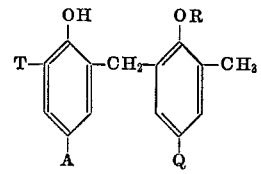

wherein:
T is a $C_4$ to $C_{12}$ tertiary alkyl group;
A is a primary or secondary alkyl group having 1–12 carbon atoms, or the radical T;
R is a $C_1$ to $C_{12}$ primary alkyl group or the benzyl radical; and
Q is a T or an A radical.

4. Foamed polyurethanes containing 0.05 to 10% by weight of a stabilizer selected from the group consisting of

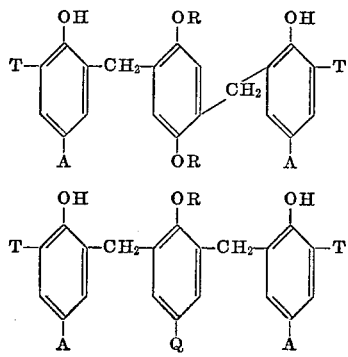

and

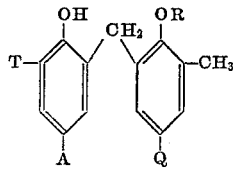

wherein
T is a $C_4$ to $C_{12}$ tertiary alkyl group;
A is a primary or secondary alkyl group having 1–12 carbon atoms or the radical T;
R is a $C_1$ to $C_{12}$ primary alkyl group or the benzyl radical;
Q is a T or an A radical.

5. Solutions of polyurethane elastomers containing 10–33% by weight of substantially linear, segmented polyurethane and 0.05 to 10% by weight based on the polyurethane of a stabilizer selected from the group consisting of

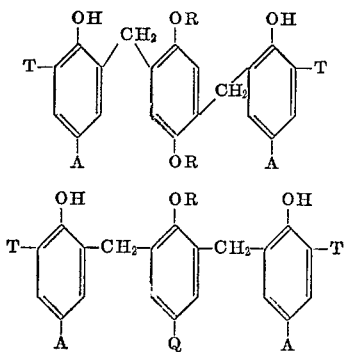

and

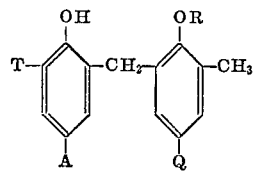

wherein
T is a $C_4$ to $C_{12}$ tertiary alkyl group;
A is a primary or secondary alkyl group having 1–12 carbons atoms or the radical T;
R is a $C_1$ to $C_{12}$ primary alkyl group or the benzyl radical;

Q is a T or an A radical; in a highly polar aliphatic solvent having amide, urea, or sulfoxide groups and boiling points up to 225° C.

6. Stabilized polyurethane elastomers having incorporated 0.05 to 5% by weight based on the polyurethane of a stabilizer mixture consisting of a member selected from the group consisting of (a)

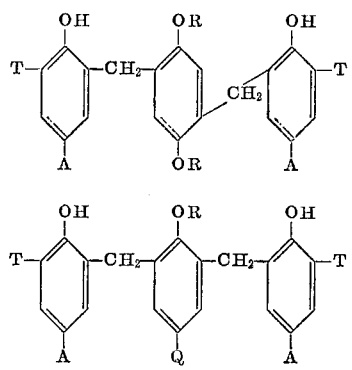

and

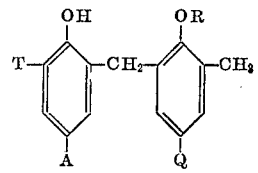

wherein
T is a $C_4$ to $C_{12}$ tertiary alkyl group;
A is a primary or secondary alkyl group having 1–12 carbon atoms or the radical T;
R is $C_1$–$C_{12}$ primary alkyl group or the benzyl radical;
Q is an A radical; and
(b) a member of the class consisting of 2-(2′-hydroxyphenyl)-benzotriazole

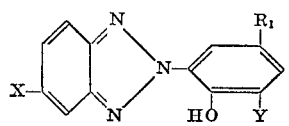

in which
X represents a hydrogen atom, an alkyl group or a halogen atom;
Y represents a hydrogen atom, an alkyl group having 1–12 carbon atoms or an N-methylenephthalimide radical; and
$R_1$ represents a hydrogen atom or an alkyl group with 1 to 12 carbon atoms, said mixture being incorporated in proportion by weight of (a) to (b) of 1:10 to 10:1 as stabilizing agent against the action of light, heat and atmospheric impurities.

7. Stabilized polyurethane elastomers of claim 6 having incorporated therein 0.05 to 5% by weight based on the polyurethane of a stabilizing mixture consisting of a member (a) selected from the class

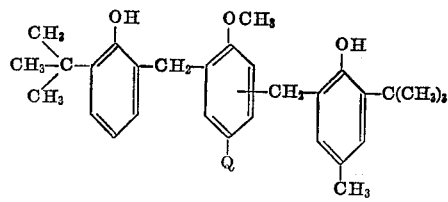

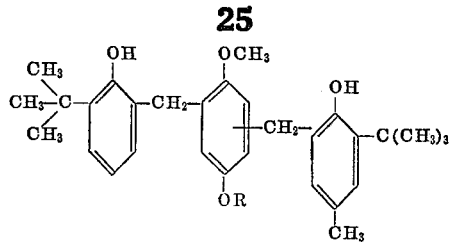
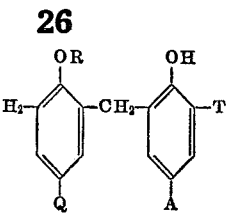

and (b) wherein
  Y is H or alkyl with 1–12 carbon atoms or a N-methylenephthalimide radical; and
  X is H or chlorine.

8. Stabilized polyurethane elastomer fibers containing 0.05 to 5.0% by weight of a stabilizer mixture consisting of (a)

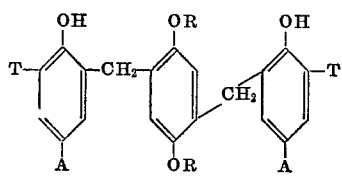

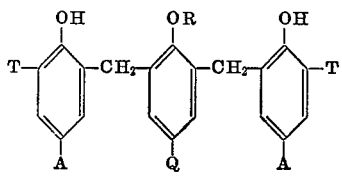

and

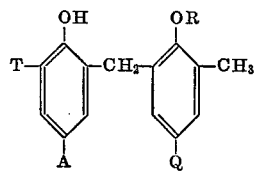

wherein
  T is a $C_4$ to $C_{12}$ tertiary alkyl group;
  A is a primary or secondary alkyl group having 1–12 carbon atoms or the radical T;
  R is a $C_1$ to $C_{12}$ primary alkyl group or the benzyl radical;
  Q is an A radical; and
(b) a 2-(2'-hydroxyphenyl)-benzotriazole of the formula

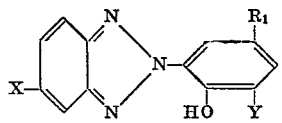

in which
  X represents a hydrogen atom, an alkyl group or a halogen atom;
  Y represents a hydrogen atom, an alkyl group having 1 to 12 carbon atoms or an N-methylenephthalimide radical; and
  $R_1$ represents a hydrogen atom or an alkyl group with 1 to 12 carbon atoms.

9. Foamed polyurethanes containing 0.05 to 5.0% by weight of a stabilizer mixture consisting of (a)

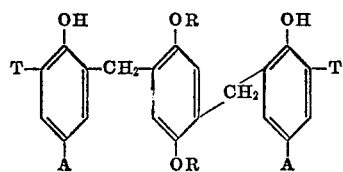

and

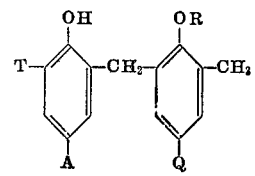

wherein
  T is a $C_4$ to $C_{12}$ tertiary alkyl group;
  A is a primary or secondary alkyl group having 1–12 carbon atoms or the radical T;
  R is a $C_1$ to $C_{12}$ primary alkyl group;
  Q is an A radical; and
(b) a 2-(2'-hydroxyphenyl)-benzotriazole of the formula

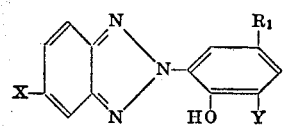

in which
  X represents a hydrogen atom, an alkyl group or a halogen atom;
  Y represents a hydrogen atom, an alkyl group having 1 to 12 carbon atoms or an N-methylenephthalimide radical; and
  $R_1$ represents a hydrogen atom or an alkyl group with 1 to 12 carbon atoms.

10. Solutions of polyurethane elastomers containing 10–33% by weight of a substantially linear, segmented polyurethane and 0.05 to 5% by weight based on the polyurethane of a stabilizer mixture consisting of (a)

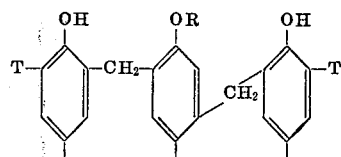

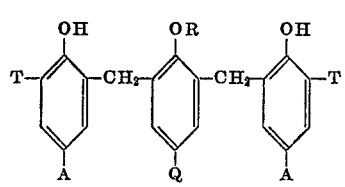

and

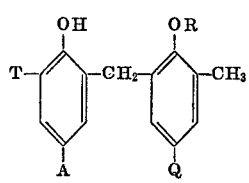

wherein
  T is a $C_4$ to $C_{12}$ tertiary alkyl group;
  A is primary or secondary alkyl group having 1–12 carbon atoms or the radical T;
  R is a $C_1$ to $C_{12}$ primary alkyl group or the benzyl radical;
  Q is an A radical; ;and (b)

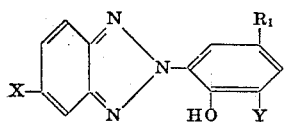

in which

X represents a hydrogen atom, an alkyl group or a halogen atom;
Y represents a hydrogen atom, an alkyl group having 1 to 12 carbon atoms or an N-methylenephthalimide radical; and
$R_1$ represents a hydrogen atom or an alkyl group with 1 to 12 carbon atoms, said mixture being incorporated in proportion by weight of (a) to (b) of 1:10 to 10:1, as stabilizing agent against the action of light, heat and atmospheric impurities; in a highly polar aliphatic solvent having amide, urea, or sulfoxide groups and boiling points up to 225° C.

11. Fibers of claim 8 wherein in (b) X is H or chlorine.
12. Polyurethane of claim 9 wherein in (b) X is H or chlorine.
13. Solutions of claim 10 wherein in (b) X is H or chlorine.

References Cited
UNITED STATES PATENTS

| | | | |
|---|---|---|---|
| 3,510,451 | 5/1970 | Seki et al. | 260—45.95 X |
| 3,450,653 | 6/1969 | McClellon | 260—45.95 X |
| 3,446,771 | 5/1969 | Matsubayashi | 260—45.95 |
| 3,437,694 | 4/1969 | Austin | 260—2.5 X |
| 3,429,837 | 2/1969 | Langrish | 260—2.5 X |
| 3,401,145 | 9/1968 | Rogers | 260—2.5 X |
| 3,330,873 | 7/1967 | Godin | 260—45.95 X |
| 3,067,259 | 12/1962 | Bailey | 260—45.95 X |
| 2,915,496 | 12/1959 | Swart | 260—2.5 X |
| 3,476,814 | 11/1969 | Meltsner | 260—45.95 |

DONALD E. CZAJA, Primary Examiner

C. W. IVY, Assistant Examiner

U.S. Cl. X.R.

252—404; 260—30.8 DS, 32.6 R, 45.8 N, 45.95, 77.5 SP, 613 R